April 23, 1935.    R. M. KRISAN    1,998,933
TIRE CHAIN
Filed Feb. 13, 1933
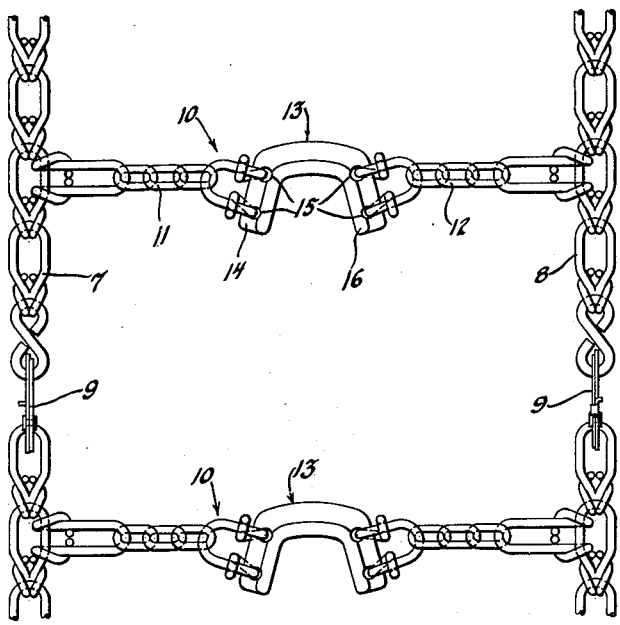
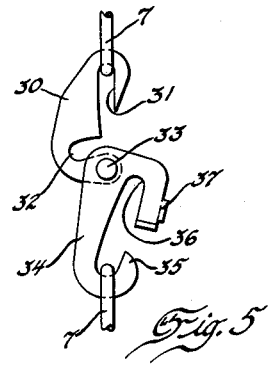
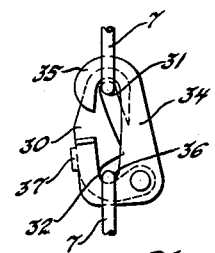
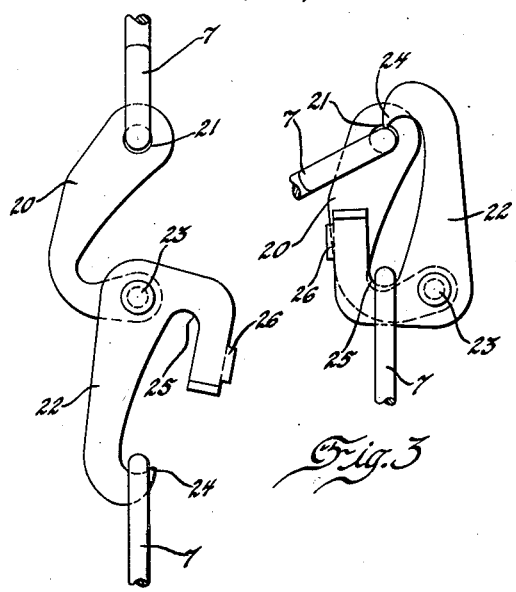
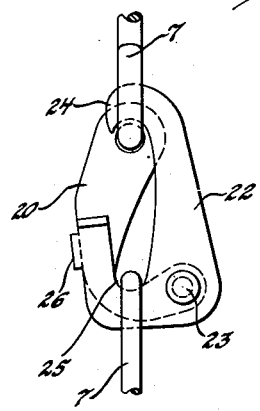
INVENTOR.
Rudolph M. Krisan
BY
ATTORNEY.

Patented Apr. 23, 1935

1,998,933

UNITED STATES PATENT OFFICE 1,998,933

TIRE CHAIN

Rudolph M. Krisan, Detroit, Mich., assignor of one-fifth to Joseph Machech, Detroit, Mich.

Application February 13, 1933, Serial No. 656,526

3 Claims. (Cl. 152—14)

My invention relates to improvements in tire chains and more particularly to an improved tire chain of the general type disclosed in my United States Letters Patent No. 1,855,974.

The construction shown in my said patent utilizes a plurality of U-shaped members linked together and covering the tread of the tire. The construction in this patent has been found to be expensive to manufacture, cumbersome to install, and too heavy to be of commercial use. In addition, it has been found that the U-shaped members constructed in accordance with the disclosures of this patent tend to fill up with ice, mud, and the like, and to lose much of their efficiency.

The improvement of the present tire chain over the tire chain disclosed in the said patent, resides in a simplification of the structure, the elimination of many needless parts, and the provision of a new type of locking mechanism for holding the side tire chains in intimate contact with the side walls of a tire.

Tire chains heretofore in use have consisted of a pair of substantially parallel side chain members and a plurality of members secured to said parallel side chain members and adapted to be held in intimate contact with the tread portion of the tire. Many such cross members have been so constructed that excessive wear and scuffing is set up on the surface of the tread of the tire, which results in a rapid deterioration of the tire.

It is, therefore, an object of my present invention to provide a tire chain which is simple to construct, economical to use, and light in weight, and in which provision is made for the ready attachment of the chain to a tire or the detachment of the chain from a tire.

It is a further object of my present invention to provide an improved form of cross member which is adapted to increase the traction of a tire to which it is applied, and to eliminate skidding, the cross member being so constructed that it may be formed of any desired material and may be used without causing scuffing or rapid wear on the tread of the tire, and at the same time having a much longer life in use than cross members heretofore employed in such constructions.

It is a further object of my present invention to provide a tire chain utilizing a novel form of cross member which is so constructed as to remain substantially free from ice and mud during its operation, thus retaining its efficiency under all operating conditions.

These and various other objects, features of arrangement, construction and operation, are plainly shown and described and will be best understood by reference to the accompanying drawing showing a preferred embodiment of my invention, in which:

Fig. 1 is a fragmentary plan view of a portion of a tire chain embodying my invention;

Fig. 2 is a detailed enlarged plan view of a lock member utilized in a tire chain embodying my invention in the open position;

Fig. 3 is a plan view of a lock embodying my invention in a partially closed position;

Fig. 4 is a plan view of the lock shown in Fig. 3, with the lock member completely closed and the chains held in locked relation to each other;

Figs. 5 and 6 are plan views showing a modified type of locking member embodying my invention.

Similar reference numerals refer to similar parts throughout the several views.

Referring more in detail to the drawing, and particularly to Fig. 1, reference numerals 7 and 8 designate substantially parallel side chain members adapted to contact the side walls of a tire to which the tire chain is to be applied. Chains of this general type are known to the art and are of different lengths to accommodate different sized tires with which the chains are intended to be used. The ends of the chains 7 and 8 are detachably secured together by means of locking members 9.

Extending substantially at right angles to the chains 7 and 8 is a plurality of tread chains 10. Each of the tread chains 10 consists of a chain link member 11, secured to the side chain member 7, and a chain link member 12 secured to the side chain member 8. The end of the chain member 11 opposite the point of engagement with the side chain 7, is secured to an anti-skid member 13, and the end of the chain 12 opposite the point of attachment to the side chain 8 is secured to the opposite side of the tread member 13 from the point at which the chain member 11 is secured thereto.

The anti-skid member 13 is formed in the shape of a horseshoe and is so held in place in the tire chain that when mounted on a tire the closed end of the horseshoe leads in the direction of travel. The member 13 is substantially L-shaped in cross section and is provided with a flange member 14, in which a plurality of openings 15 is provided to permit attachment of the connecting chains 11 and 12.

By placement of the holes 15 on the flange 14 as shown, it is possible to hold the tread member 13 securely in place by the use of but one connecting chain on each side of the tread member. Being substantially L-shaped in cross section, the tread member 13 provides a road-contacting flange 16, which extends substantially at right angles to the flange portion 14. As shown, the tread member 13 is in the form of an open horseshoe, and there is no metal inside the tread member 13 and between the inner portion of the road-contacting flange 16. By employing this construction in which no metal remains within the inside of the road-contacting flange 16, I have found that the tendency to accumulate ice or mud inside the road-contacting flange 16 is practically eliminated, and that the road-contacting flange 16 impresses upon the road surface a substantially U-shaped mark defined by the clear cut lines of the road-contacting flange 16.

In order to facilitate the easy attachment of the tire chain embodying my invention to a tire, or the easy removal of the tire chain from the tire, I provide the locking member shown in various positions in Figs. 2, 3 and 4. As here shown, the locking member consists of a hook-shaped member 20, having therein an opening 21 in which a link of the chain 7 is secured. At the end of the hook-shaped member 20, opposite the point of attachment of the chain 7, a member 22 is pivotally connected by a rivet 23, or similar means. The member 22 is provided with a hooked portion 24 and a slotted portion 25. Adjacent the slotted portion 25 is a flange portion 26. In the modification of the hook member shown in Figs. 5 and 6, I propose instead of the opening 21 in the member 20 to provide a hook member 30, having a slot 31 and a slot 32 in the body portion thereof, the slot 31 being adapted to engage a link of the chain 7. Pivotally mounted to the member 30 by a rivet or similar means 33, is a member 34, having a hook portion 35 and a slotted portion 36. Adjacent the slotted portion 36 is a flange portion 37.

The operation of my invention is as follows:

A tire chain embodying my invention may be used as any conventional type of tire chain. In placing such a tire chain upon the tire it is essential that the lock members 9 be in the extended position shown in Fig. 2. When in this position it is possible to provide slack in the side chains 7 and 8 to facilitate the easy placement of the chains upon the tire.

When in this position with the hook portion 24 engaging the link of the chain 7, the chains are adjusted to position on the tire. The member 22 is then caused to pivot about the point 23 and to close the lock member 9. This shortens the over-all length of the attached side chains and the locking member, resulting in the taking up of the slack in the chain.

As shown in Fig. 3, the link at one end of the chain is caught in the slotted portion 25 and the hook portion 24 passes over the link in the other end of the chain which is retained in the opening 21. Continuing the pivoting movement, the hook portion 24 engages the link in the side chain and is so shaped as to be held in the locking position when the chain is placed on the tire. This locking engagement is maintained because of the pull each way on the adjacent ends of the chain, and by the hooked engagement of the hook 24 with the link at the end of the side chain. The flange 26 passes over the surface of the member 20 during this pivoting movement and is sprung from its normal position so that when the lock is fully closed, as shown in Fig. 3, the flange 26 springs back to its normal position and so aids in holding the elements of the locking member in the closed locking position even though the hook member 24 might fail to engage the link in the end of the side chain under all operating conditions.

The modification of the locking member shown in Figs. 5 and 6, operates as the locking member just described except that it is not necessary that the locking member here shown be permanently secured to the ends of the side chains, it being sufficient for the operation of this locking member that the end of the side chain be placed in the slot 31 in the member 30. In this embodiment of my invention the links on the ends of the side chains are locked in their relative positions by means of the slots 31 and 32 and the slot 36 and the hook 35, as shown clearly in Fig. 6.

A tire chain embodying my invention, when placed upon a tire, has been found to operate much more satisfactorily than other known types of tire chains in that the tread members 13 keep themselves clear of the formation of ice or mud cakes therein in such a manner as to impair the amount of road-contacting surface available for use. As has heretofore been pointed out, the tread members 13 which I propose to use are so formed as to keep themselves substantially free from such accumulated ice or mud, so that in all operating conditions the amount of road-contacting surface is substantially unimpaired.

It also is to be observed that considerable wear upon the flange 16 forming a part of the tread member 13 may be permitted without impairing its utility, by varying the length of the flange member 16 so that as it wears down there is still additional road-contacting surface available.

While I have illustrated a preferred embodiment of my invention, many modifications may be made without departing from the spirit of the invention, and I do not wish to be limited to the precise details of construction as herein set forth, but desire to avail myself of all changes within the scope of the appended claims.

Having thus described my invention, what I claim is new and desire to secure by Letters Patent of the United States is:

1. A tire chain including a pair of substantially parallel side chains adapted to contact with opposite sides of a tire, a locking member adjacent one end of each of said side chains and adapted to lock the adjacent ends of each of said side chains, anti-skid means attached to said parallel side chains at regular intervals and including a tread member substantially in the shape of an open horseshoe having a toe portion and an open heel portion, the said toe portion and the ends of said heel portion lying in lines extending substantially at right angles to said side chains, flexible connecting members extending substantially at right angles from said parallel side chains beneath and connected with said tread member at each side thereof to space said tread member from the tire and permit a limited pivotal movement of said member relative to the tire about an axis extending substantially through the points of connection between said member and said flexible connecting members.

2. A tire chain including a pair of substantially parallel side chains adapted to contact with opposite sides of a tire, a locking member adjacent one end of each of said side chains and adapted to lock the adjacent ends of each of said side chains, anti-skid means attached to said parallel side chains at regular intervals and including a tread member substantially in the shape of an open horseshoe having a toe portion and an open heel portion, the said toe portion and the ends of said heel portion lying in lines extending substantially at right angles to said side chains, each of said tread members being substantially L-shaped in cross section and having a flat surface thereof adjacent the point of contact with the tire tread, flexible connecting members extending beneath and secured to said tread members and out of engagement with the tire tread, and connected at one end with said tread members substantially at right angles thereto and connected at the other end with said side chains, the point of connection of said flexible members and said tread members permitting a pivotal movement of said tread members about an axis extending substantially through the points of attachment between said flexible connecting members and said tread engaging members.

3. An anti-skid attachment for vehicle wheels including a road contacting member in the shape of an open horseshoe with its toe portion so placed as to travel forward in the line of travel of the wheel, an open heel portion rearwardly thereof, flexible connecting members extending between the road contacting member and the vehicle wheel and secured adjacent each side of said road contacting member at points intermediate the toe and heel portions thereof, and cooperating with the vehicle wheel to maintain the tread thereof in spaced relation to the road contacting member while permitting pivotal movement of the road contacting member relative to said flexible members.

RUDOLPH M. KRISAN.